United States Patent
Riggins

(10) Patent No.: US 9,308,987 B1
(45) Date of Patent: Apr. 12, 2016

(54) DRAG REDUCTION UTILIZING DRIVEN MICRO-CAVITIES

(71) Applicant: The Curators of the University of Missouri, Columbia, MO (US)

(72) Inventor: David W. Riggins, St. James, MO (US)

(73) Assignee: The Curators of the University of Missouri, Columbia, MO (US)

( * ) Notice: Subject to any disclaimer, the term of this patent is extended or adjusted under 35 U.S.C. 154(b) by 120 days.

(21) Appl. No.: 14/451,247

(22) Filed: Aug. 4, 2014

Related U.S. Application Data

(60) Provisional application No. 61/993,983, filed on May 15, 2014.

(51) Int. Cl.
  *B64C 1/38* (2006.01)
  *B64C 21/02* (2006.01)

(52) U.S. Cl.
  CPC ..................................... *B64C 21/02* (2013.01)

(58) Field of Classification Search
  USPC ................................ 244/130, 1 R, 129.1, 200
  See application file for complete search history.

(56) References Cited

U.S. PATENT DOCUMENTS

| | | | |
|---|---|---|---|
| 4,650,138 A | 3/1987 | Grose | |
| 4,736,912 A | 4/1988 | Loebert | |
| 4,750,693 A * | 6/1988 | Lobert | B64C 21/10 138/38 |
| 4,863,121 A | 9/1989 | Savill | |
| 4,907,765 A | 3/1990 | Hirschel et al. | |
| 5,114,099 A | 5/1992 | Gao | |
| 5,133,516 A * | 7/1992 | Marentic | B05D 5/02 244/130 |
| 5,133,519 A | 7/1992 | Falco | |
| 5,386,955 A * | 2/1995 | Savill | B63B 1/34 138/38 |
| 5,833,389 A * | 11/1998 | Sirovich | B64C 21/10 138/39 |
| 5,971,326 A | 10/1999 | Bechert | |
| 6,092,766 A | 7/2000 | LaRoche et al. | |
| 6,332,593 B1 * | 12/2001 | Kamiadakis | B64C 23/005 244/130 |
| 6,345,791 B1 * | 2/2002 | McClure | B63B 1/34 244/130 |

(Continued)

FOREIGN PATENT DOCUMENTS

| | | |
|---|---|---|
| EP | 1 283 163 | 7/2002 |
| JP | 2001-050215 | 2/2001 |

(Continued)

OTHER PUBLICATIONS

Machine translation of JP2001-050215, 6 pages, Feb. 23, 2001.

(Continued)

*Primary Examiner* — Christopher P Ellis
(74) *Attorney, Agent, or Firm* — Hovey Williams LLP

(57) ABSTRACT

A high-speed vehicle or device presents a surface configured to move through a fluid such that the fluid flows across the surface in a primary flow direction. The vehicle or device also presents a subsurface spaced inwardly from the surface, as well as a plurality of cavity-defining structures that project generally outwardly from the subsurface and extend along the subsurface generally transverse to the primary flow direction. The cavity-defining structures are spaced apart in the primary flow direction. Each adjacent pair of the cavity-defining structures and the subsurface at least in part cooperatively define a cavity therebetween. Fluid rollers or vortices are formed in the cavities, with frictional forces thereby being generated therein in a direction opposite of drag forces on the surface. Each of the cavity-defining structures defines at least one interconnecting channel extending between adjacent ones of the cavities to fluid interconnect said cavities.

24 Claims, 7 Drawing Sheets

(56) References Cited

U.S. PATENT DOCUMENTS

| | | | |
|---|---|---|---|
| 6,363,972 | B1 | 4/2002 | Umazume et al. |
| 7,070,850 | B2* | 7/2006 | Dietz ................ B32B 27/08 244/130 |
| 8,113,469 | B2* | 2/2012 | Lang ................ B64C 21/10 244/198 |
| 8,226,038 | B2* | 7/2012 | Smith ................ B64C 1/0009 244/130 |
| 8,444,092 | B2* | 5/2013 | Li ................ B21B 1/227 244/130 |
| 8,528,601 | B2* | 9/2013 | Dahm ................ B64C 21/10 137/809 |
| 8,684,310 | B2* | 4/2014 | Rawlings ................ B32B 3/30 244/130 |
| 8,794,574 | B2* | 8/2014 | Lang ................ B63B 1/36 244/200.1 |
| 2005/0039661 | A1 | 2/2005 | Kornblit et al. |
| 2007/0194178 | A1 | 8/2007 | Lang |
| 2010/0108813 | A1 | 5/2010 | Lang |
| 2010/0127125 | A1 | 5/2010 | Li et al. |
| 2011/0274875 | A1 | 11/2011 | Lang |
| 2012/0312930 | A1 | 12/2012 | Feusi |

FOREIGN PATENT DOCUMENTS

| WO | 03/013957 | 2/2003 |
|---|---|---|
| WO | 2010/120215 | 10/2010 |
| WO | 2011/091546 | 8/2011 |
| WO | 2012/048396 | 4/2012 |

OTHER PUBLICATIONS

Lang et al., "Bristled Shark Skin: A Microgeometry for Boundary Layer Control?," Bioinspiration & Biomimetics 3, 2008, pp. 1-9.
Lang et al., "Cavity Flow Characterization of the Bristled Shark Skin Microgeometry," AIAA Paper 2009-1107, 47th 4IAA Aerospace Sciences Meeting Including the New Horizons Forum and Aerospace Exposition, Jan. 5-8 2009, Orlando, Florida, 5 pages.
Hao et al., "Laminar Drag Reduction in Hydrophobic Microchannels," Chem. Eng. Technol., vol. 32, No. 6, 2009, pp. 912-918.
Walsh, M.J., NASA Langley Research Center, Hampton, VA, "Riblets," Viscous Drag Reduction in Boundary Layers, edited by D. Bushnell and J. Hefner, Progress in Astronautics and Aeronautics, vol. 123, 1990, pp. 203-261.
Duan et al., "Effects of Riblets on Skin Friction and Heat Transfer in High-Speed Turbulent Boundary Layers," AIAA Japer 2012-1108, 50th AIAA Aerospace Sciences Meeting including the New Horizons Forum and Aerospace Exposition, Jan. 9-12, 2012, Nashville, Tennessee, pp. 1-17.
Hwang, D.P., "An Experimental Study of Turbulent Skin Friction Reduction in Supersonic Flow Using a Microblowing Technique," NASA TM-1999-209632, AIAA-2000-0545, Dec. 1999, 12 pages.
Zhuang et al., "Supersonic Cavity Flows and Their Control," AIAA Journal, vol. 44, No. 9, Sep. 2006, pp. 2118-2128.
Lazar et al., "Control of the Shear Layer Above a Supersonic Cavity Using Energy Deposition," AIAA Journal, vol. 46, No. 12, Dec. 2008, pp. 2987-2997.
Wang, C.Y., "Flow Over a Surface with Parallel Grooves," Physics of Fluids, vol. 15, No. 5, May 2003, 1114-1121.
Huang et al., "Flow and Heat Transfer Control Over an External Surface Using a Porous Block Array Arrangement," Int. J. Heat Mass Transfer, vol. 36, No. 16, 1993, pp. 4019-4032.
Hwang, D.P., "Experimental Study of Characteristics of Micro-Hole Porous Skins for Turbulent Skin Friction Reduction," ICAS Congress, 2002, pp. 2101.1-2101-7.
Ekoto et al., "Supersonic Boundary Layers with Periodic Surface Roughness," AIAA Journal, vol. 46, No. 2, Feb. 2008, pp. 486-497.
Lang et al., "Momentum Increase in Wall Adjacent Flow Via Hexagonal Embedded Cavities," AIAA Paper 2010-914, 48th AIAA Aerospace Sciences Meeting Including the New Horizons Forum and Aerospace Exposition, Jan. 4-7, 2010, Orlando, Florida, pp. 1-5.

Gatski et al., "Embedded Cavity Drag in Steady Laminar Flow," AIAA Journal, vol. 23, No. 7, Jul. 1985, pp. 1028-1037.
Arous et al., "Influence of Upstream Flow Characteristics on the Reattachment Phenomenon in Shallow Cavities," Thermal Science, vol. 15, No. 3, 2011, pp. 721-734.
Lang et al., "Boundary Layer Formation Over D-Type Roughness Geometries," AIAA Paper 2008-506, 46th AIAA Aerospace Sciences Meeting and Exhibit, Jan. 7-10, 2008, Reno, Nevada, pp. 1-5.
Leibenguth, C.M., "Drag Reduction Over a Low Reynolds Number Cavity Surface," Master's Thesis, Department of Aerospace Engineering, University of Alabama, 2012, 48 pages.
http://vulcan-cfd.larc.nasa.gov/, VULCAN Home Page, Nov. 2010, 2 pages.
Menter, F.R., "Two-Equation Eddy-Viscosity Turbulence Models for Engineering Applications," AIAA Journal, vol. 32, No. 8, Aug. 1994, pp. 1598-1605.
Liggett et al., "Cavity Flow Assessment Using Advanced Turbulence Modeling," AIAA Paper 2010-1200, 48th AIAA Aerospace Sciences Meeting Including the New Horizons Forum and Aerospace Exposition, Jan. 4-7, 2010, Orlando, Florida, pp. 1-18.
Schetz, J.A., Boundary Layer Analysis, Prentice Hall, 1993, Chapter 10, pp. 414-427.
Schlichting, H., Boundary-Layer Theory, McGraw-Hill, 1960, Chapter XXIII, pp. 702-728.
Anderson, J.D., Modem Compressible Flow, McGraw-Hill, 1990, Chapter 4, pp. 127-149, pp. 164-175, Chapter 1, pp. 18-23.
Eniutin, et al., "An experimental study of turbulent friction on surfaces with discontinuous longitudinal ribbing," TsAGI, Jchenye Zapiski, 1991, vol. 22, No. 3, pp. 43-50, (abstract only available).
Zhao et al., "An experimental study of turbulent boundary layer over the grooved-surface," Experiments and Measurements in Fluid Mechanics, Feb. 2004, (abstract only available).
Hu et al., "Research on Numerical Computation of Near-wall Fluid Field on Grooved Surface," Fire Control and Command Control, Apr. 2008, (abstract only available).
Naterer, G.F., "Irreversibility Ratio and Passive Flow Control With Aligned Surface Micro-Grooves," American Institute of Aeronautics and Astronautics, Inc., 3rd AIAA Flow Control Conference, Jun. 5-8, 2006, San Francisco, Califomia, 9 pages.
Luchini et al., "Resistance of Grooved Surface to Parallel Flow and Cross-Flow," J. Fluid Mech, vol. 228, Jul. 1991, p. 87, (abstract only available).
Dubief et al., "Large eddy simulation of a boundary layer flow passing over a groove," Symposium of Turbulent Shear Flows, 11th, Grenoble, France, Sep. 8-10, 1997, Proceedings. vol. 1 (A98-22409 05-34), Grenoble, France, Institut National Polytechnique de Grenoble, 1997, p. 1-1 to 1-6, (article unavailable).
Sutardi, C.Y. Ching, "Effect of a transverse square groove on a turbulent boundary layer," Experimental Thermal and Fluid Science 20 (1999) 1-10.
Nang et al., "Application studying of PIV on groove drag reduction characteristics," Proc. SPIE 7375, ICEM 2008: International Conference on Experimental Mechanics 2008, 737520, Aug. 24, 2009, (abstract only available).
Frohnapfel et al., "Experimental investigations of turbulent drag reductions by surface-embedded grooves," J. Fluid Mech. (2007), vol. 590, pp. 107-116.
Dosaka et al., "Turbulent drag reduction of a d-type rough wall boundary layer with longitudinal ribs placed within the grooves," Proceedings of the 9th and 10th NAL Workshop on Investigation and Control of Boundary-Layer Transition, Nov. 1992, pp. 67-70, (abstract only available).
Pulles, C.J.A., "Drag Reduction of Turbulent Boundary Layers by Means of Grooved Surfaces," Thesis, Eindhoven, Mar. 4, 1988, 143 pages.
Chang et al., "Experimental study on coherent structure passive control and drag reduction in turbulent boundary layer with grooved surface," Journal of Aerospace Power, May 2008, (abstract only available).
Li et al., "Experimental study on Reynolds shear stress in turbulent boundary layers over smooth and drag reduction grooved surface," Journal of Experiments in Fluid Mechanics, Jan. 2006, (abstract only available).

(56) References Cited

OTHER PUBLICATIONS

Li et al., "Experiment Study on V-groove Drag Reduction," Pipeline Technique and Equipment, Jun. 2009, (abstract only available).
Nalsh, M.J., NASA Langley Research Center, High-Speed Aerodynamics Div., Hampton, VA, US, "Drag characteristics of V-groove and transverse curvature riblets," Viscous flow drag reduction, Symposium, Dallas, TX, Nov. 7-8, 1979, Technical Papers. (A81-26501 10-34) New York, American Institute of Aeronautics and Astronautics, Inc., 1980, pp. 168-184, (abstract only available).
Pulles et al., "Turbulence measurements over longitudinal micro-grooved surfaces," Applied Scientific Research, Jul. 1989, vol. 46, Issue 3, pp. 197-208, (abstract only available).
Wang et al., "The Technical Research and Application Development of Groove Surface in Turbulent Drag Reduction," Journal of Southwest Petroleum University (Science and Technology Edition), Jan. 2008, (abstract only available).
"Microscopic Rib Profiles Will Increase Aircraft Economy in Flight," Aircraft Engineering and Aerospace Technology, vol. 60, Issue 1, pp. 11-11, (abstract only available).
Zhao et al., "Application of Micro—Grooved Surface for Turbulent Drag Reduction," Journal of Petrochemical Universities, 2004, vol. 17, Part 3, pp. 76-79, (article unavailable).
Tullis et al., "The time dependent flow over V- and U-groove riblets of different sizes," Phys. Fluids 6 (3), Mar. 1994, pp. 1310-1314.
Coustols, E., "Effect of grooved surfaces (riblets) on the structure of a turbulent boundary layer," Mecanique & Industries, vol. 2, No. 5, Oct. 1, 2001, pp. 421-434(14), (abstract only available).
Schwarz-Vanmanen et al., "Coherent structures over grooved surfaces," Ph.D. Thesis Technische Univ., Eindhoven (Netherlands), Jan. 1992, (abstract only available).
Adachi T., "Improvement of wing characteristics by machining V-grooves along the suction surface of an airfoil," Fourth International Symposium on Experimental and Computational Aerothermodynamics of Internal Flows, Dresden, Aug. 31-Sep. 2, 1999, (abstract only available).
Cui et al., "A Numerical Study on Pressure Drop in Microchannel Flow with Different Bionic Micro-Grooved Surfaces," Journal of Bionic Engineering 9 (2012) 99-109.
Liu et al., "Analysis on Factors and Mechanism of Drag Reduction by Grooved Surface," Chuanbo Lixue (Journal of Ship Mechanics), vol. 11, Dec. 2007, (abstract only available).
Howard et al., NASA Langley Research Center, Hampton, VA, US, "Longitudinal afterbody grooves and shoulder radiusing for low-speed bluff body drag reduction," American Society of Mechanical Engineers, Winter Annual Meeting, Washington, DC, Nov. 15-20, 1981, 8 p., (abstract only available).
Maksoud et al., "On the drag reduction of the flow over an airfoil," ICAS, Congress, 19th, Anaheim, CA, Sep. 18-23, 1994, Proceedings. vol. 1 (A94-31534 10-01), Washington, DC, American Inst. Of Aeronautics and Astronautics, Inc., 1994, p. 104-108, (article unavailable).
Feng et al., "Fabrication and drag reduction property of polymer coating with micron-scale structured surface," Journal of Functional Materials, Aug. 2012, (abstract only available).
Bandyopadhyay et al., "Development of a Microfabricated Surface for Turbulence Diagnostics and Control," ASME, Application of Microfabrication to Fluid Mechanics, vol. 197, 1994, pp. 67-74, (article unavailable).

* cited by examiner ns application claims priority from U.S. Provisional Application No. 61/993,983, filed May 15, 2014, the entire disclosure of which is hereby incorporated by reference herein.

DRAG REDUCTION UTILIZING DRIVEN MICRO-CAVITIES

CROSS-REFERENCE TO RELATED APPLICATIONS

The present application claims priority from U.S. Provisional Application No. 61/993,983, filed May 15, 2014, the entire disclosure of which is hereby incorporated by reference herein.

BACKGROUND OF THE INVENTION

1. Field of the Invention

The present invention relates generally to a vehicle or device for use in high-speed applications. More particularly, the present invention concerns a vehicle or device for use in high-speed applications, wherein the vehicle or device utilizes micro-cavities for the reduction of drag.

2. Discussion of the Prior Art

Those of ordinary skill in the art will appreciate that high-speed vehicles or devices are used in a variety of applications, including but not limited to air, space, land, or water travel, transportation, and/or exploration, as well as combat applications. As such vehicles or devices move through a fluid (e.g., air or water), they are subjected to drag both due to their shape (pressure drag) and due to friction generated by the convective motion of the fluid over the vehicle or device surfaces (skin friction drag). Drag negatively affects the efficiency and other operational capabilities of the vehicle or device.

SUMMARY

According to one aspect of the present invention, a high-speed vehicle or device is provided. The vehicle or device comprises a surface, a subsurface, and a plurality of cavity-defining structures. The surface is configured to move through a fluid such that the fluid flows across the surface in a primary flow direction. The fluid flow defines a velocity gradient ranging from a first velocity adjacent the surface to a free stream velocity at a position spaced a first distance from the surface in an outward direction, the outward direction being at least substantially perpendicular to the primary flow direction. The fluid flow thereby defines a boundary layer having a boundary layer thickness at least substantially equal to the first distance. The subsurface is spaced from the surface in an inward direction. The inward direction is at least substantially opposite the outward direction. The plurality of cavity-defining structures project generally in the outward direction relative to the subsurface and extend relative to the subsurface generally transverse to the primary flow direction. The cavity-defining structures are spaced apart in the primary flow direction. Each of the cavity-defining structures presents a generally upstream face, a generally downstream face, and a midpoint spaced between the upstream face and the downstream face. Each adjacent pair of the cavity-defining structures and the subsurface at least in part cooperatively define a cavity therebetween. Each of the cavities presents a cavity depth defined as a distance in the inward direction between the surface and the subsurface. Each of the cavities presents a cavity length defined as a distance between the midpoints of a corresponding pair of the cavity-defining structures. Each of the cavity-defining structures defines at least one interconnecting channel extending between adjacent ones of the cavities to fluidly interconnect said cavities.

According to another aspect of the present invention, a system for reducing aerodynamic drag and increasing fluid dynamic separation control is provided. The system comprises a surface, a subsurface, and a plurality of cavity-defining structures. The surface is configured to move through a fluid at a high speed such that the fluid flows across the surface in a primary flow direction. The fluid flow defines a velocity gradient ranging from a first velocity adjacent the surface to a free stream velocity at a position spaced a first distance from the surface in an outward direction, the outward direction being at least substantially perpendicular to the primary flow direction. The fluid flow thereby defines a boundary layer having a boundary layer thickness at least substantially equal to the first distance. The subsurface is spaced from the surface in an inward direction. The inward direction is at least substantially opposite the outward direction. The plurality of cavity-defining structures project generally in the outward direction relative to the subsurface and extend relative to the subsurface generally transverse to the primary flow direction. The cavity-defining structures are spaced apart in the primary flow direction. Each of the cavity-defining structures presents a generally upstream face, a generally downstream face, and a midpoint spaced between the upstream face and the downstream face. Each adjacent pair of the cavity-defining structures and the subsurface at least in part cooperatively define a cavity therebetween. Each of the cavities presents a cavity depth defined as a distance in the inward direction between the surface and the subsurface. Each of the cavities presents a cavity length defined as a distance between the midpoints of a corresponding pair of the cavity-defining structures. Each of the cavity-defining structures defines at least one interconnecting channel extending between adjacent ones of the cavities to fluid interconnect said cavities.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 1:
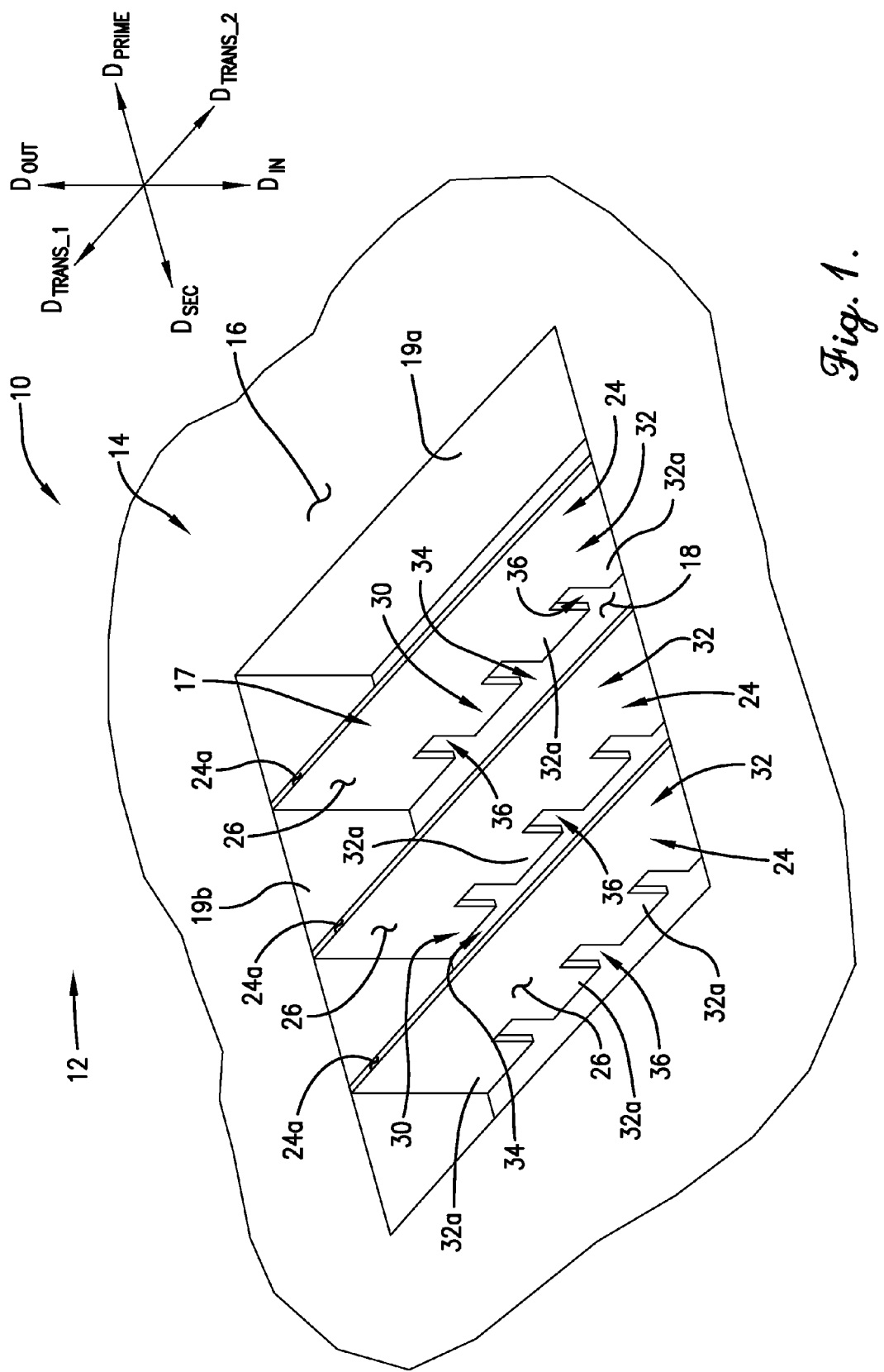
FIG. 1 is a front perspective view of a portion of a high-speed vehicle or device in accordance with a first preferred embodiment of the present invention.
Figure 2:
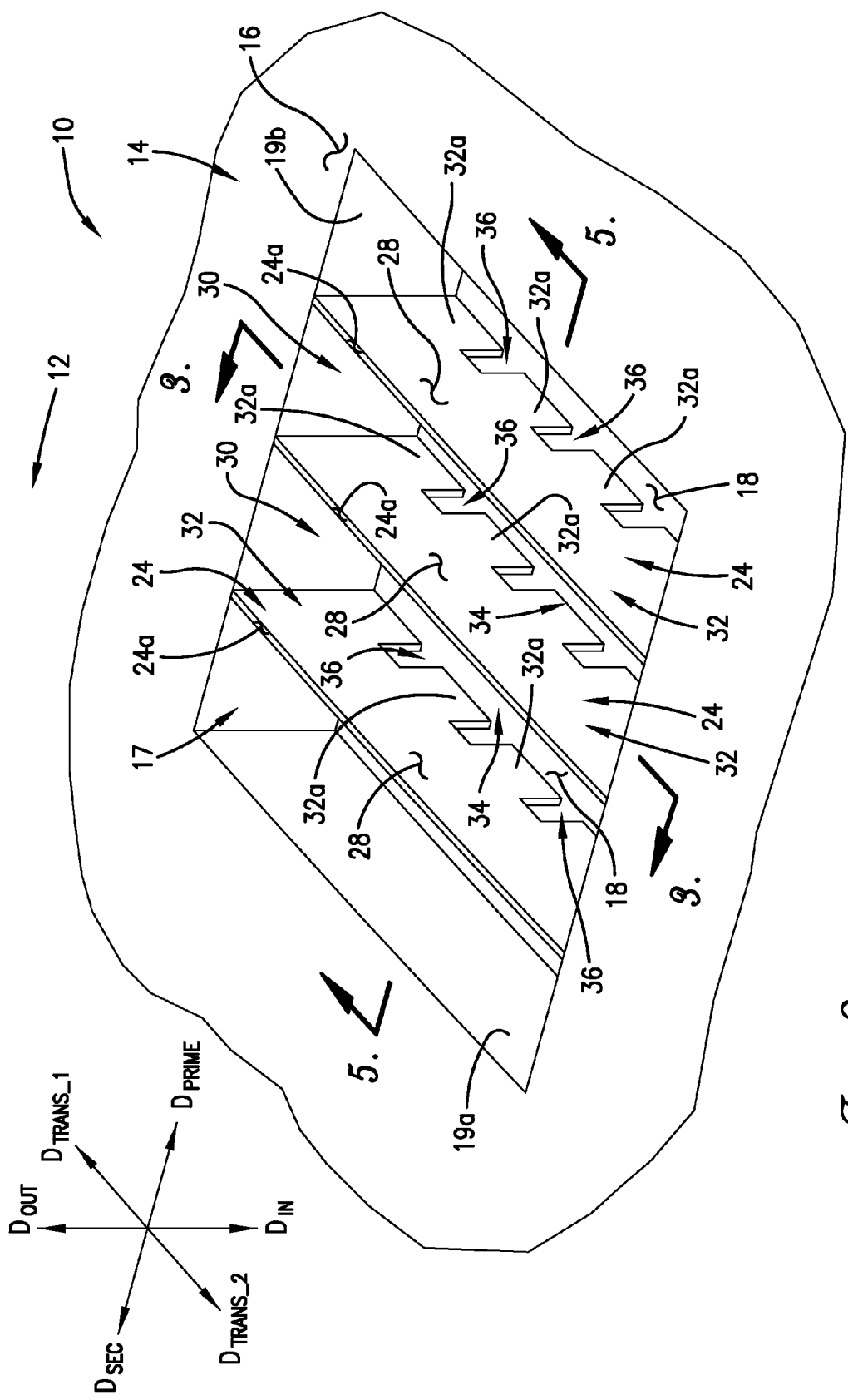
FIG. 2 is a rear perspective view of the portion of the vehicle or device of FIG. 1.
Figure 3:
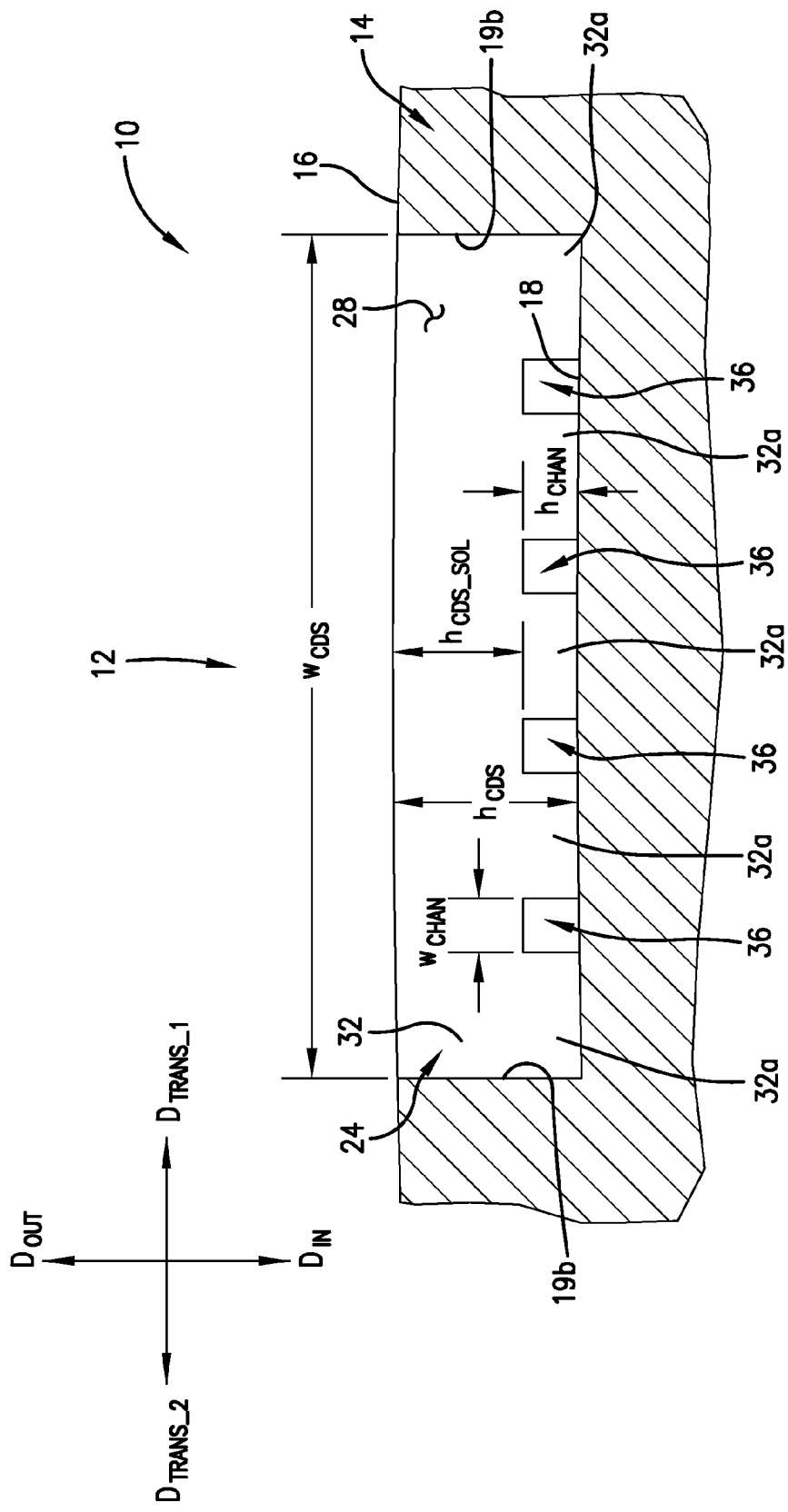
FIG. 3 is a rear view of the portion of the vehicle or device of FIGS. 1 and 2, taken along section line 3-3 of FIG. 2, particularly illustrating the relative dimensions of the channels and one of the cavity-defining structures.
Figure 4:
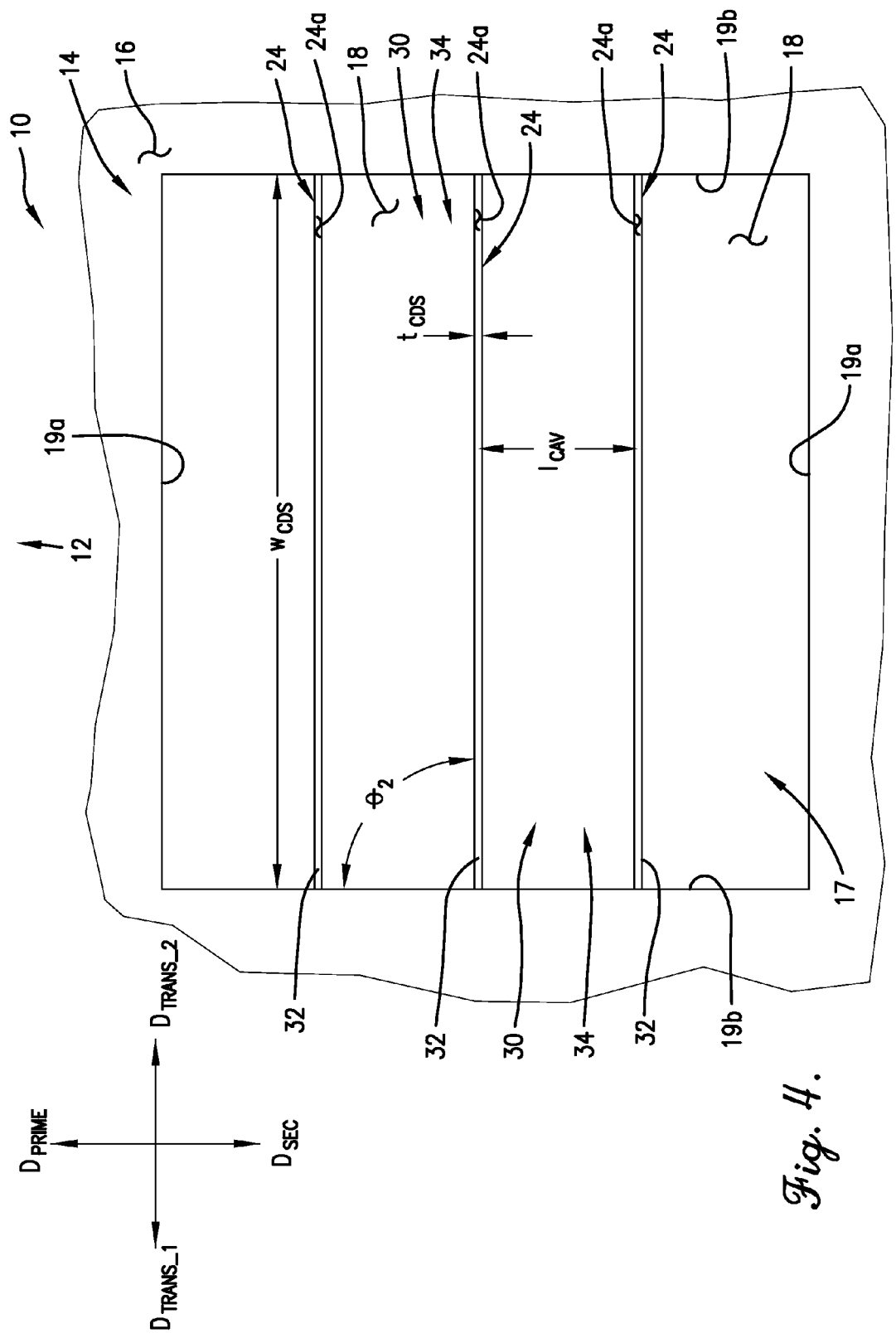
Figure 5:
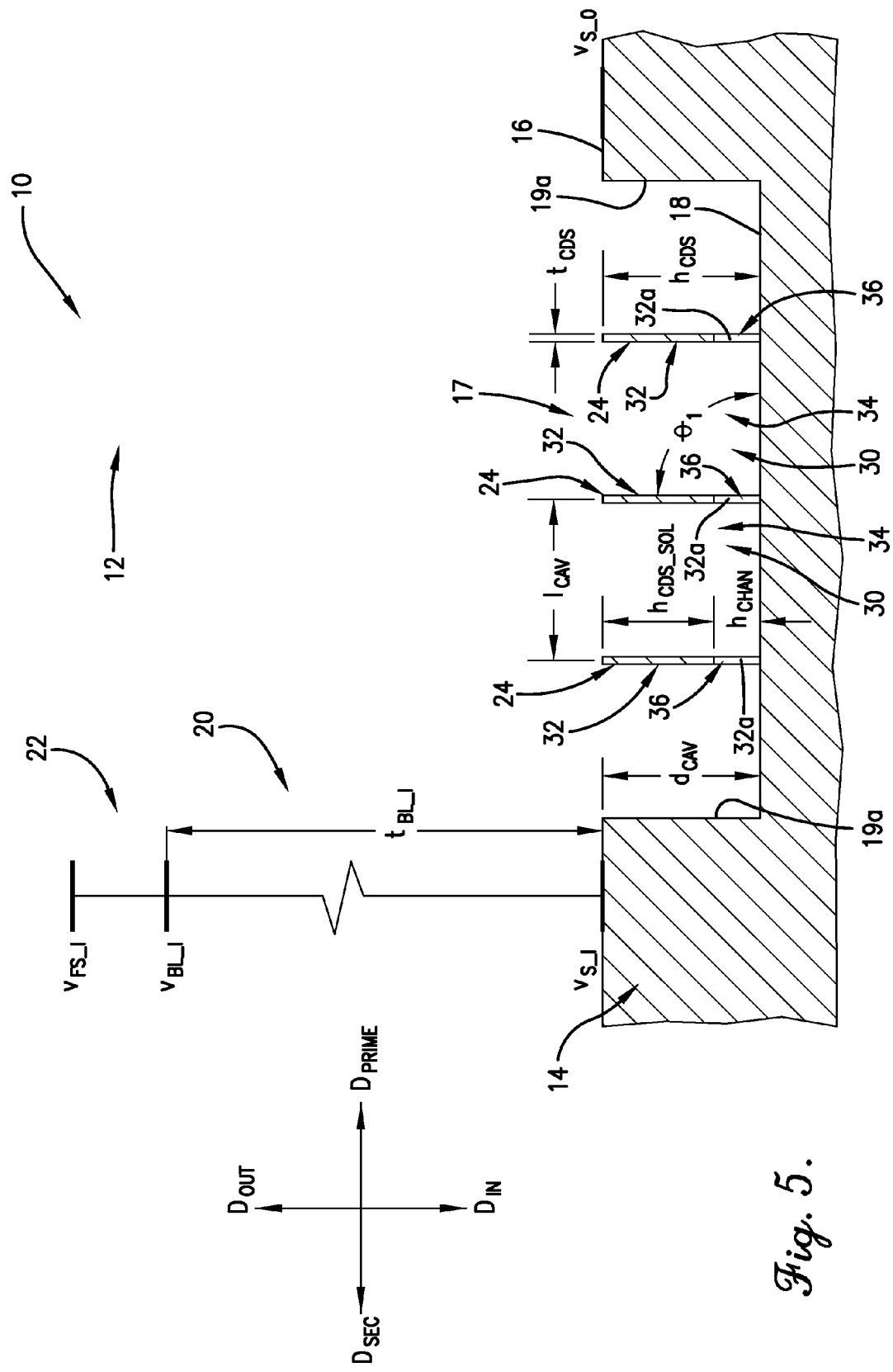
Figure 5A:
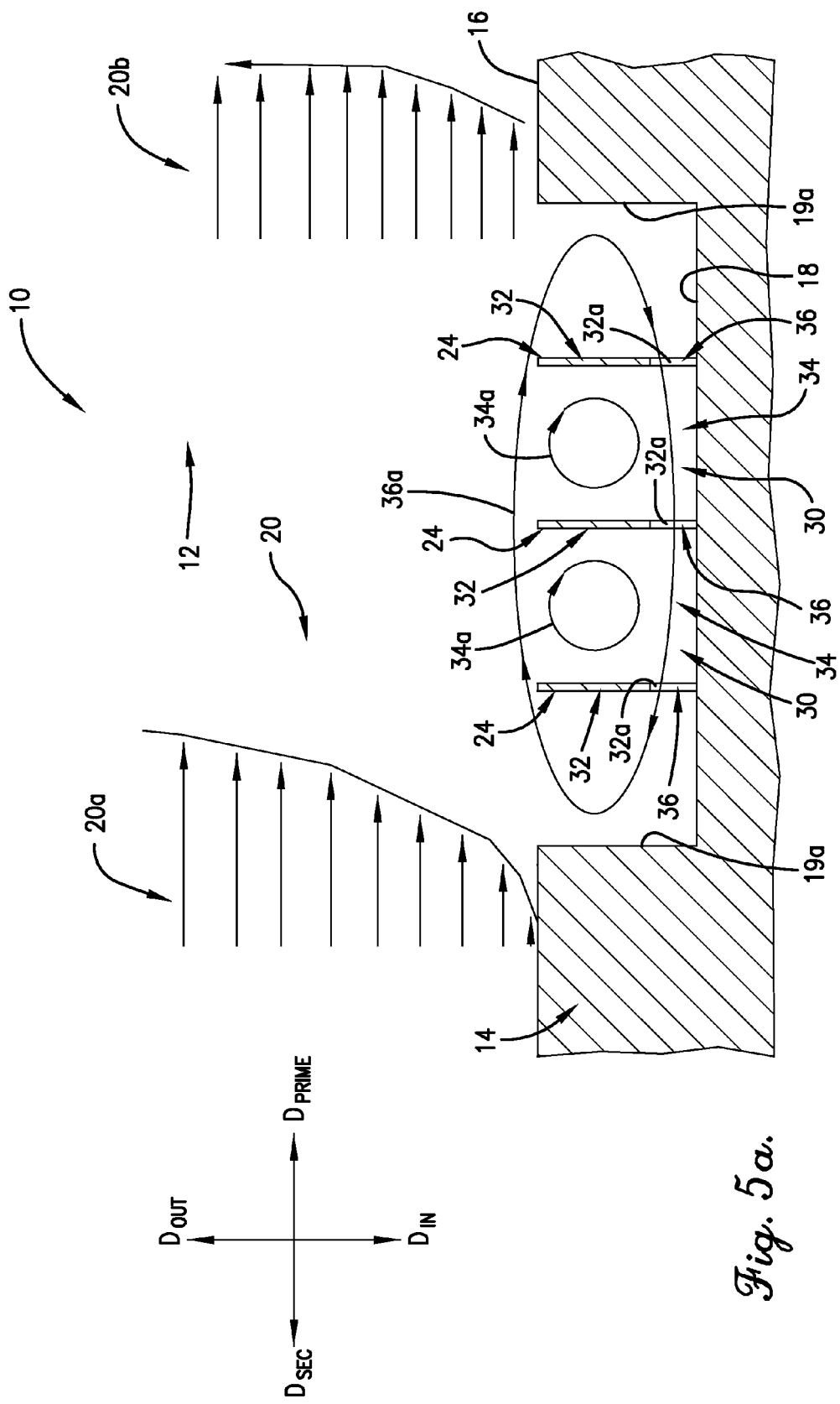
Figure 6:
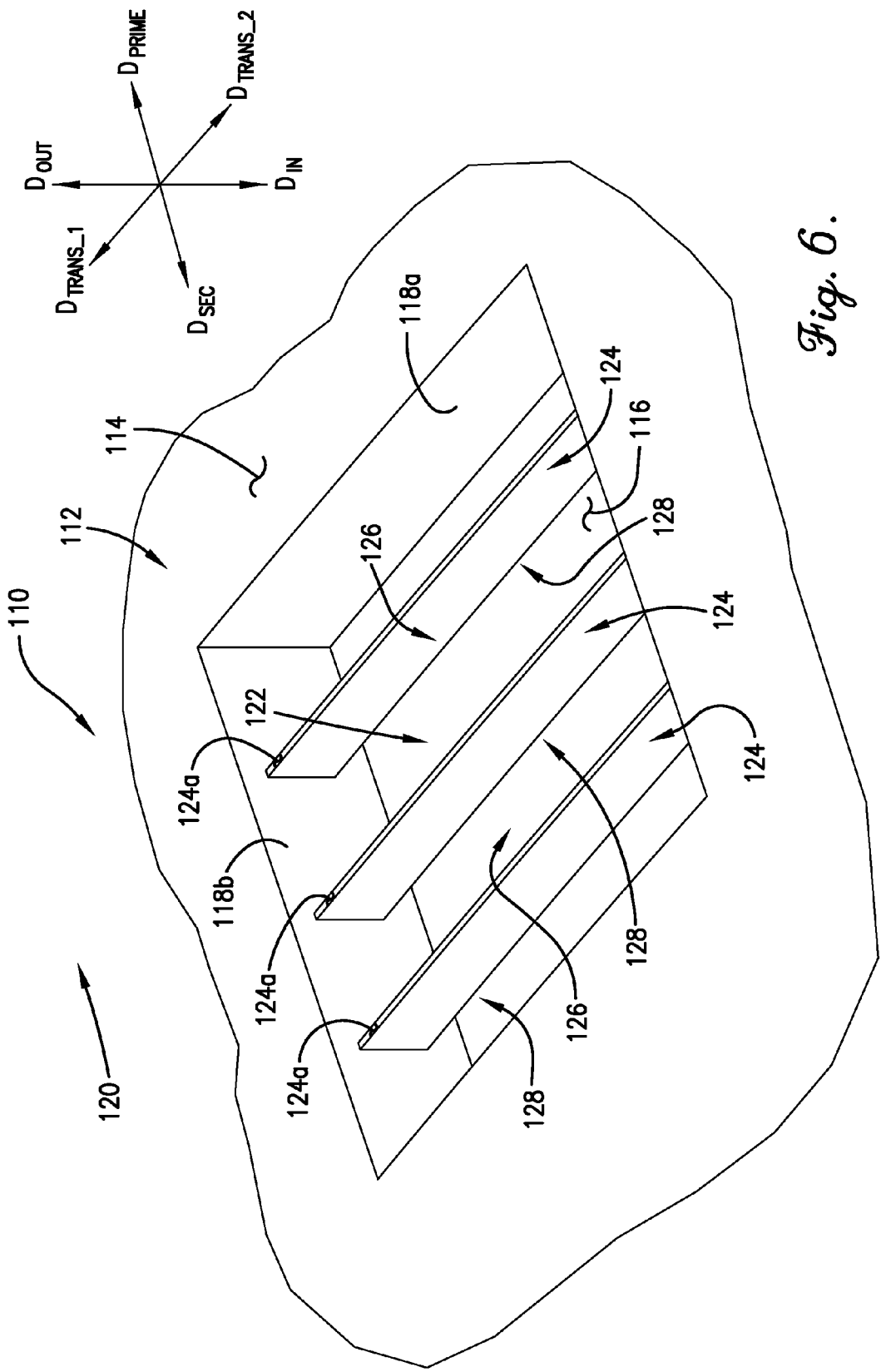

FIG. 4 is a top view of the portion of the vehicle or device of FIGS. 1-3, particularly illustrating the dimensions, spacing, and orientation of the cavity-defining structures; and FIG. 5 is a side view of the portion of the vehicle or device of FIGS. 1-4, taken along section line 5-5 of FIG. 2, particularly illustrating the dimensions, spacing, and orientation of the cavity-defining structures, the channel dimensions, and the boundary layer;

FIG. 5a is a side view of the portion of the vehicle or device shown in FIG. 5, particularly illustrating the idealized flow of a fluid near the vehicle or device and adjacent the cavity-defining structures; and FIG. 6 is a front perspective view of a portion of a high-speed vehicle or device in accordance with a second preferred embodiment of the present invention, particularly illustrating recessed cavity-defining structures spanning the entire cavity width without provision of intermediate support structures.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., upstream/downstream, inward/outward, horizontal/vertical, etc.) are used herein solely for the sake of convenience and should be understood only in relation to each other. For instance, a component might in practice be oriented such that directions referred to as "inward" and "outward" are sideways, angled, inverted, etc. relative to the chosen frame of reference; or a direction referred to as "upstream" might under certain circumstances actually be a downstream direction.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1-5a, a vehicle or device 10 is provided in a fluid 12. According to some aspects of the present invention, the vehicle or device 10 may be any one or more of a variety of types, although preferred vehicles or devices are generally configured for use at high velocities, as will be discussed in greater detail below. For instance, the vehicle or device 10 might be an air platform such as a commercial or military aircraft; a weapon or weapon component such as a missile or torpedo; a spacecraft such as a rocket or satellite; or a hydrodynamic vehicle such as a submarine. A variety of other suitable applications will be readily apparent to one of ordinary skill in the art.

It is also permissible according to some aspects of the present invention for the fluid 12 to be of any sort, although generally Newtonian fluids are preferred. Air and water are most preferred.

As will be discussed in greater detail below, the incoming free stream velocity $v_{FS\_I}$ of the fluid 12 relative to the vehicle or device 10 preferably ranges from approximately Mach 0 to Mach 8 and most preferably ranges from approximately 0.05 Mach to Mach 3.

Those of ordinary skill in the art will readily understand that more specific ranges within the above preferred velocity ranges are associated with various advantages and disadvantages. For instance, at transonic and low supersonic speeds (e.g., speeds from approximately 0.8 Mach to 1.2 Mach), shock waves may cause complications, while heat transfer problems (perhaps leading to increased risk of melting, etc.) are typically significant at hypersonic speeds (e.g., speeds of approximately Mach 5 and above).

It is also preferable that the flow of the fluid 12 is characterized by a Reynold's number from 0 to $1 \times 10^8$.

The vehicle or device 10 preferably includes a solid body 14 defining a surface 16. The surface 16 is configured to move through the fluid 12 such that the fluid 12 flows across the surface 16 in a primary flow direction $D_{PRIME}$ (preferably, a generally downstream direction).

The solid body 14 also preferably defines a chamber 17. More particularly, the solid body 14 preferably defines a subsurface 18, a pair of end walls 19a, and a pair of side walls 19b that at least in part define the chamber 17.

The subsurface 18 is preferably spaced from the surface 16 in an inward direction $D_{IN}$ that is preferably at least substantially perpendicular to the primary flow direction $D_{PRIME}$. The chamber 17 is therefore preferably recessed relative to the surface 16.

The end walls 19a and the side walls 19b preferably extend generally in the inward direction $D_{IN}$ from the surface 16 to the subsurface 18. Furthermore, in the preferred embodiment illustrated in FIGS. 1-5a, adjacent ones of the end walls 19a and the side walls 19b are perpendicular to each other such that the chamber 17 is generally cuboidal. However, it is permissible according to some aspects of the present invention for the chamber to be non-cuboidal. For instance, the end walls and side walls might be curved so as to define a circular or elliptical chamber cross-section, or the end walls and side walls might be vertically slanted such that the chamber is shaped like a portion of a pyramid or cone.

The solid body 14 is preferably an aircraft wing, a missile fin, or a portion thereof, although other forms are permissible according to some aspects of the present invention. For instance, the solid body might alternatively be associated with a spacecraft, a hydrodynamic machine, or one of the other aforementioned vehicles or devices.

The surface 16 preferably covers only a selected portion of the solid body 14. The portion is preferably selected based upon the prevailing aerodynamics during normal use or during the usage for which the invention is expected to be most beneficial. For instance, on a commercial aircraft, the surface might preferably be located only on a mid-region of the upper surface of a wing rather than wrapping around the leading edge or extending all the way to the fuselage. Exclusion of certain regions may suitably be due to the more irregular flow patterns expected in those regions.

The surface 16 preferably presents a surface contour, while the subsurface 18 preferably presents a subsurface contour. Preferably, the surface 16 and the subsurface 18 are at least substantially planar, such that the respective contours are at least substantially flat. It is also preferable that the contours be at least substantially similar. Yet further, it is preferred that the surface 16 and the subsurface 18 be generally parallel.

It is also preferred that the primary flow direction $D_{PRIME}$ be at least substantially parallel to the surface 16 and the subsurface 18.

Applicant notes that it will be readily apparent to one of ordinary skill in the art that the meaning of phrases such as "at least substantially planar," "at least substantially flat," "at least substantially similar," and "generally parallel" as used herein should be understood in the context of the scale of the vehicle or device as a whole. For instance, a surface that upon microscopic examination might be considered highly irregular and curved might reasonably be considered to be "at least substantially flat" when considered relative to the large scale of a passenger aircraft.

Although the above-described general configurations of the surface 16 and the subsurface 18 are preferred, it is permissible according to some aspects of the present invention for variations to be implemented. For instance, either or both the surface and/or the subsurface might alternatively be at least substantially curved. The curves might suitably be either concentric (or otherwise generally equally spaced from one another at all or at least substantially all points) or non-concentric (or otherwise generally not equally spaced from one another at all or at least substantially all points). The curves might also be similar or non-similar in shape. Either or both of the surface and/or the subsurface might be formed as part of a sphere or cylinder, for instance, or define a plurality of transverse or concentric waves.

As best shown in FIG. 5, the incoming fluid flow preferably defines an incoming velocity gradient ranging from an incoming surface velocity $v_{S\_I}$ adjacent the surface 16 to the incoming free stream velocity $v_{FS\_I}$ at a position spaced a first distance from the surface 16 in an outward direction $D_{OUT}$. The outward direction $D_{OUT}$ is preferably at least substantially perpendicular to the primary flow direction $D_{PRIME}$ and is thus preferably at least substantially opposite the inward direction $D_{IN}$.

The incoming velocity gradient is preferably at least substantially linear, although use of the inventive system in flow conditions presenting an alternative incoming velocity profile is permissible according to some aspects of the present invention.

As will be discussed in greater detail below, the outgoing fluid flow preferably defines an outgoing surface velocity $v_{S\_O}$ adjacent a downstream portion of the surface 16 that is greater than the incoming surface velocity $v_{S\_I}$.

As schematically illustrated in FIG. 5, a maximum incoming boundary layer velocity $v_{BL\_I}$ that is approximately 99.5% of the incoming free stream velocity $v_{FS\_I}$ preferably occurs at a second, slightly smaller distance (also in the outward direction $D_{OUT}$ from the surface 16) than the incoming free stream velocity $v_{FS\_I}$. The flow of the fluid 12 thus preferably defines a boundary layer 20 having an incoming boundary layer thickness $t_{BL\_I}$ at least substantially equal to the second distance. That is, the boundary layer 20 as the flow enters the vicinity of the chamber 17 is defined by the region in which the velocity transitions from the incoming surface velocity $v_{S\_I}$ to the maximum incoming boundary layer velocity $v_{BL\_I}$.

The region outward of the boundary layer 20, for which the velocity is the incoming free stream velocity $v_{FS\_I}$, may be referred to as the bulk layer 22.

The incoming surface velocity $v_{S\_I}$ is preferably approximately 0 m/s. As noted previously, the incoming free stream velocity $v_{FS\_I}$ preferably ranges from approximately Mach 0 to Mach 8 and most preferably ranges from approximately 0.05 Mach to Mach 3.

FIG. 5a provides an idealized, two-dimensional (2D) schematic illustration of a preferred incoming fluid boundary layer velocity profile 20a and a preferred outgoing fluid boundary layer velocity profile 20b. As will be discussed in greater detail below, the downstream velocity profile 20b is fuller than the upstream velocity profile 20a (larger velocities at the downstream surface 16).

Although the above-provided descriptions of discrete fluid layers and well-defined velocities are convenient for descriptive purposes herein, it will be readily understood by those of ordinary skill in the art that such descriptions may in some cases of actual use (e.g., use in unpredictable environments) be overly simplistic. Thus, those of ordinary skill in the art will understand that the above descriptions should be understood as providing only a general framework by which the behaviors discussed herein may be described and understood.

A plurality of cavity-defining structures 24 preferably project generally in the outward direction $D_{OUT}$ relative to the subsurface 18 so as to be at least substantially orthogonal to the subsurface 18. More particularly, a generally vertical angle $\Theta_1$ (if one defines the orientation of the subsurface 18 as generally horizontal) is preferably defined between each cavity-defining structure 24 and the portion of the subsurface 18 most immediately adjacent the respective cavity-defining structure 24. The angle $\Theta_1$ is preferably between approximately forty-five degrees (45°) and one hundred thirty-five degrees (135°) and is more preferably between approximately eighty degrees (80°) and one hundred degrees (100°). Most preferably, the angle $\Theta_1$ is ninety degrees (90°).

Preferably, the cavity-defining structures 24 generally extend relative to the subsurface 18 in directions $D_{TRANS\_1}$ and $D_{TRANS\_2}$ that are transverse to the primary flow direction F. That is, in a preferred embodiment, the cavity-defining structures 24 generally extend parallel to the end walls 19a and perpendicular to the side walls 19b. Each cavity-defining structure 24 thus presents an upstream face 26, a downstream face 28 spaced at least generally in the primary flow direction $D_{PRIME}$ a thickness $t_{CDS}$ from the upstream face 26, and a midpoint spaced evenly between the upstream face 26 and the downstream face 28. A generally horizontal angle $\Theta_2$ (if one defines the orientation of the subsurface 18 as generally horizontal) is preferably defined between each cavity-defining structure 24 (or, more particularly, the generally transverse direction of extension of the cavity-defining structure 24) and the primary flow direction $D_{PRIME}$. The angle $\Theta_2$ is preferably between approximately forty-five degrees (45°) and one hundred thirty-five degrees (135°) and is more preferably between approximately eighty degrees (80°) and one hundred degrees (100°). Most preferably, the angle $\Theta_2$ is ninety degrees (90°).

As will be discussed in greater detail below, in a preferred embodiment and as illustrated in FIGS. 1-5a, the cavity-defining structures 24 are in contact with the subsurface 18 (whether integral therewith or not). That is, they project from and extend along the subsurface 18. However, as will also be discussed in greater detail below, it is permissible according to some aspects of the present invention for the cavity-defining structures to be spaced away from the subsurface.

Preferably, the width $w_{CDS}$ of each cavity-defining structure 24 is as small as possible within manufacturing and operational constraints. Furthermore, each cavity-defining structure 24 preferably has the same width $w_{CDS}$, although width variations are permissible according to some aspects of the present invention.

Each cavity-defining structure 24 preferably defines a height $h_{CDS}$. Preferred heights $h_{CDS}$ will be discussed in greater detail below.

In a preferred embodiment, each of the cavity-defining structures 24 is formed so as to be generally stiff (i.e., resistant to bending, twisting, and/or buckling). It is permissible according to some aspects of the present invention, however, for one or more of the cavity-defining structures to be generally flexible in one or more modes of deformation.

In a preferred embodiment, each of the cavity-defining structures 24 is integrally formed with the subsurface 18. For instance, the cavity-defining structures 24 might be integrally molded with the subsurface 18 or formed via machining or etching of the surface 16 (such machining or etching also thereby defining the subsurface 18). It is permissible according to some aspects of the present invention, however, for non-integral cavity-defining structures to be used. The cavity-defining structures might be adhered to the subsurface, for instance; or fasteners such as tabs, bolts, pegs, or screws might be used.

It is also permissible according to some aspects of the present invention for the cavity-defining structures to be additionally or alternatively integral with other portions of the solid body 14. For instance, in the embodiment of FIGS. 1-5a, it is preferred that the cavity-defining structures 24 also be integrally formed with the side walls 19b.

The cavity-defining structures 24 are preferably spaced apart in the primary flow direction $D_{PRIME}$ such that each adjacent pair of cavity-defining structures 24 and the subsurface 18 at least in part cooperatively define a cavity 30 therebetween. As will be discussed in greater detail below, each cavity 30 is preferably configured such that a fluid vortex having a generally transverse axis is formed therein when the vehicle or device 10 is in high speed use. The fluid flow in each cavity 30 is thus in part in a secondary flow direction $D_{SEC}$ at least substantially opposite the primary flow direction $D_{PRIME}$. (The secondary flow direction $D_{SEC}$ is thereby preferably a generally upstream direction and is also preferably the general direction of travel of the vehicle or device 10.)

Preferably, each cavity 30 has a length $l_{CAV}$ defined as the distance between the midpoint of a first one of the cavity-defining structures 24 and the midpoint of the adjacent cavity-defining structure 24. Each cavity length $l_{CAV}$ is preferably at least substantially constant along the generally transverse extent of the cavities 30. (That is, the cavity-defining structures 24 are preferably at least substantially parallel.) As will be discussed in more detail below, however, it is permissible according to some aspects of the present invention for the cavity length to vary transversely.

Each cavity 30 also preferably has a depth $d_{CAV}$ defined as the distance in the inward direction $D_{IN}$ between the surface 16 and the portion of the subsurface 18 that in part defines the cavity 30.

In a preferred embodiment, the cavity-defining structures 24 are evenly spaced apart such the cavity lengths $l_{CAV}$ are at least approximately equal. It is permissible according to some aspects of the present invention, however, for the cavity lengths $l_{CAV}$ to vary regularly (e.g., to decrease in a predictable manner in the primary flow direction $D_{PRIME}$) or to be generally irregular.

Furthermore, it is preferred that each of the cavity depths $d_{CAV}$ are at least approximately equal. It is permissible according to some aspects of the present invention, however, for the cavity depths $d_{CAV}$ to vary regularly or to be generally irregular.

Preferably, the ratio of the cavity depth $d_{CAV}$ to the cavity length $l_{CAV}$ for each cavity 30 is from approximately five tenths (0.5) to five (5).

Furthermore, it is preferred that the ratio of each cavity depth $d_{CAV}$ to the incoming boundary layer thickness $t_{BL\_1}$ is from approximately zero (0) to two tenths (0.2).

Preferred nominal values of the cavity depths $d_{CAV}$ will vary widely depending on the particular application (e.g., the projected operational incoming free stream velocity $v_{FS\_1}$ range; the desired type of fluid 12; and the size of the vehicle or device 10, or the region of the vehicle or device on which the cavity-defining structures 24 are to be located). Cavity depths $d_{CAV}$ may also be to some extent limited based on the formation techniques used (e.g., machining, etching, etc., as discussed previously). However, is contemplated that preferred depths $d_{CAV}$ will range from one hundredth (0.01) mm to two hundred (200) mm.

In a preferred embodiment and as illustrated in FIGS. 1-5a, the cavity depths $d_{CAV}$ are at least substantially equivalent to the cavity-defining structure heights $h_{CDS}$. That is, each cavity-defining structure 24 preferably presents an outermost face 24a that in part defines the surface 16. As will be discussed in greater detail below, however, it is permissible according to some aspects of the present invention for one of more of the cavity-defining structure heights $h_{CDS}$ to vary relative to the cavity depths $d_{CAV}$. For instance, the cavity-defining structures might be shorter than the cavity depths such that the outermost faces are recessed relative to the surface.

The number of cavity-defining structures 24 is preferably selected based on the particular application, with factors including but not limited to the projected operational incoming free stream velocity $v_{FS\_1}$ range; the desired type of fluid 12; and the size of the vehicle or device 10, or the region of the vehicle or device on which the cavity-defining structures 24 are to be located.

In a preferred embodiment, each cavity-defining structure 24 preferably comprises a wall 32. The wall 32 preferably extends at least substantially smoothly along the generally transverse directions $D_{TRANS\_1}$ and $D_{TRANS\_2}$, although waves, corrugations, and/or other variations such as zig-zags in one or more of the cavity-defining structures are permissible according to some aspects of the present invention.

Furthermore, the wall 32 preferably extends along an at least substantially straight trajectory in the generally transverse directions $D_{TRANS\_1}$ and $D_{TRANS\_2}$. It is permissible according to some aspects of the present invention, however, for a substantially curved, angular, and/or otherwise irregular trajectory to be followed by one or more of the cavity-defining structures.

It is also preferable that the wall 32 has an at least substantially constant width (preferably equal to the cavity-defining structure width $w_{CDS}$) in the primary flow direction $D_{PRIME}$. It is permissible according to some aspects of the present invention, however, for major or minor width variations to occur. For instance, the transverse cross-section of the wall might include one or more enlarged regions, as would occur if the wall included a series of columns interconnected by bridges or if the wall gradually expanded in width toward its transverse center.

A fluid pocket 34 is preferably defined in each cavity 30. As the boundary layer flow travels over each cavity 30 in the primary flow direction $D_{PRIME}$, it drives the fluid pocket 34 within the respective cavity 30 to form an internal or embedded individual cavity roller or vortex 34a (shown schematically in FIG. 5a) having directional components in at least the inward direction $D_{IN}$, the secondary flow direction $D_{SEC}$, and the outward direction $D_{OUT}$. That is, the flowing boundary layer 20 imparts shear forces on the fluid pockets 34 so as to cause rotation of the fluid therein about a generally transverse axis.

Preferably, frictional thrust-contributing forces in the primary flow direction $D_{PRIME}$ (i.e., the frictional forces generated by the portion of the fluid flowing in the secondary direction $D_{SEC}$) at least in part offset the frictional drag-contributing forces in the secondary flow direction $D_{SEC}$ (i.e., the frictional forces generated by the fluid flow in the primary flow direction $D_{PRIME}$ over the surface 16). That is, the net skin friction drag is preferably reduced or at least substantially eliminated in the area local to the cavities 30 or, even more preferably, for the solid body 14 or the vehicle or device 10 as a whole. Still more preferably, the frictional forces in the primary flow direction $D_{PRIME}$ are actually greater than the frictional drag forces in the second flow direction, with skin friction effects thus providing a net contribution to thrust locally, for the solid body 14, or for the vehicle or device 10 as a whole.

Preferably, the interactions between the boundary layer 20 and each fluid pocket 34 are at least substantially limited to the transfer of the shear forces necessary to drive rotation of the rollers 34a. That is, the fluid pockets 34 (and thus the rollers 34a formed therein) are generally segregated from the boundary layer flow to the greatest possible extent. For instance, mass interchange between the boundary layer 20 and the fluid pockets 34 should be minimized. However, it will be understood by one of ordinary skill in the art that at least some degree of interaction beyond that required solely to drive the rollers 34a will likely occur.

In a preferred embodiment, the rollers 34a impart frictional forces in the inward and outward directions $D_{IN}$ and $D_{OUT}$ along the walls 32. Such inward and outward frictional forces are preferably least substantially canceled by each other and do not contribute to the net balance of forces in the primary and/or secondary flow directions $D_{PRIME}$ and $D_{SEC}$, respectively. It is permissible, however, for unequal forces in the inward and outward directions to exist without departing from the scope of the present invention.

As will be readily apparent to one of ordinary skill in the art, pressure drag effects will occur due to the presence of the cavity walls 32. Preferably, these pressure drags effects are less significant than the reduction in skin friction drag, with skin friction effects combined with pressure drag effects thus leading to less overall drag (or, ideally, a contribution to thrust) than would be present absent the cavity-defining structures 24.

Each wall 32 preferably at least in part defines at least one interconnecting channel 36 extending therethrough to fluidly interconnect adjacent ones of the cavities 30. In the first preferred embodiment, as illustrated in FIGS. 1-5a, each wall 32 includes a plurality of support portions 32a that extend all the way to the subsurface 18 and at least in part define the interconnecting channels 36.

The interconnecting channels 36 allow for the development of larger, very coherent and steady recirculating regions 36a (shown schematically in FIG. 5a) that pass therethrough and span many cavities 30. That is, the interconnecting channels enable the development of multi-cavity vortices or rollers 36a in addition to the previously described internal rollers 34a defined in individual cavities 30.

The interconnecting channels 36 generally enable communication of fluid dynamic effects between cavities 30 and/or cavity-defining structures 24. Such effects may include but are not limited to pressure, velocity, mass transfer, and/or combinations thereof.

For instance, the provision of both the cavities 30 and the interconnecting channels 36 enables enhanced skin friction reduction or elimination due to the net skin friction along the subsurface 18 being in a direction $D_{SEC}$ that is opposite to the main fluid flow direction $D_{PRIME}$, with the interconnecting channels 36 enhancing the lower (counter-flow) transport of fluid along the subsurface 18. That is, skin friction drag is reduced or eliminated in the cavity region (i.e., in the vicinity of the chamber 17) due to the coherent, multi-cavity "reverse" jet flow associated with the bottom of the multi-cavity vortex or roller 36a.

Furthermore, the provision of both the cavities 30 and the interconnecting channels 36 enables downstream fluid dynamic separation control (delay or inhibition) due to a fuller downstream velocity profile 20b (i.e., larger velocities at the downstream portion of the surface 16). That is, the cavities 30 and the interconnecting channels 36 enable better inhibition or delay of downstream fluid dynamic separation (reverse flow near boundary) due to the larger velocities near the surface downstream of cavity region (as compared to a flow without the cavity region with interconnecting channels).

More particularly, the large multi-cavity vortex or fluid roller 36a provides a significant "fuller" velocity profile 20b at the downstream (exiting) structure wall. This can delay or inhibit any tendency of the downstream flow (the flow downstream of the cavity region) to separate (when flow begins to move upstream adjacent to the solid boundary). This has obvious impact for applications in terms of generally reducing separation-induced drag on downstream surfaces, or for inhibiting undesirable upstream interactions associated with separation (e.g., inhibiting undesirable engine "unstart" in jet engine applications, in which the separated region grows and moves forward into upstream components of the engine).

Another potentially advantageous effect enabled by the interconnecting channels 36 is pressure equilibration for reducing unsteadiness.

It will be understood by those of ordinary skill in the art that other advantages may also be realized, depending on the specific application.

The concept from the standpoint of the physics and performance of the benefits of the concept really prefers a two-dimensional flow pattern as shown schematically in FIG. 5a, such that the interconnecting channels 36 should be as wide as possible. The support portions 32a of the walls 32 should therefore only be provided as structural supports as necessary (i.e., the support portions 32a should be as narrow and as few as possible).

For instance, although four (4) support portions are necessary for the structural integrity of the embodiment illustrated in FIGS. 1-5a, in certain alternate embodiments it would be preferable for only a single channel to be formed in one or more of the cavity-defining structures. Such a single channel might be at least in part defined by one or more support portions and might be transversely central or offset. Furthermore, it might extend along only a small portion of the transverse width of the cavity-defining structure or over a large portion thereof, with the large extension being more preferable if structurally possible.

As will be discussed in greater detail below, it is also possible according to some aspects of the present invention for a single channel to extend along the entirety of the transverse width of the cavity-defining structure, with the cavity-defining structure thus essentially being a bridge spanning the subsurface.

As will be readily apparent to one of ordinary skill in the art, variables including but not limited to the material properties to be used for the walls, the other dimensions of the walls, the environment in which the vehicle or device is to be used, the manufacturing costs and capabilities associated with production, and the pressures to which the walls will be subjected will play a role in determining the size and number of support portions, if any are provided.

In a preferred embodiment as illustrated in FIGS. 1-5a, the interconnecting channels 36 are preferably at least substantially horizontally aligned, both within a given cavity-defining structure 24 and relative to the channels 36 of the other cavity-defining structures 24. It is permissible according to some aspects of the present invention, however, for channels to be formed at varying heights (i.e., distances from the subsurface 18) within each cavity-defining structure and/or relative to those of other cavity-defining structures. Furthermore, multiple rows and/or stacks of channels may be formed without departing from the scope of some aspects of the present invention.

The interconnecting channels 36 are also preferably at least substantially transversely aligned from one cavity-defining structure 24 to the next, such that fluid flow through the channels 36 in the primary flow direction $D_{PRIME}$ or the secondary flow direction $D_{SEC}$ is at least substantially unobstructed. However, it is permissible according to some aspects of the present invention for the interconnecting channels of one cavity-defining structure to be transversely offset relative to the interconnecting channels of one or more other cavity-defining structures.

Preferably, the interconnecting channels 36 are evenly spaced apart in the transverse directions $D_{TRANS\_1}$ and $D_{TRANS\_2}$, both within each cavity-defining structure 24 and among all cavity-defining structures 24. It is permissible according to some aspects of the present invention, however, for uneven spacing to occur within each cavity-defining structure and/or relative to those of other cavity-defining structures.

Preferably, the interconnecting channels 36 are enclosed and positioned at least substantially adjacent the subsurface 18. Most preferably, the interconnecting channels 36 are in part enclosed by the subsurface 18. That is, the channels 36 are immediately adjacent and thus in part defined by the subsurface 18. It is permissible according to some aspects of the present invention, however, for some or all of the channels to be spaced away from the subsurface yet still enclosed. The channels might extend through a vertically central region of the corresponding cavity-defining structure, for instance.

Yet further, non-enclosed channels, whether adjacent the subsurface or not, are permissible according to some aspects of the present invention. For instance, non-enclosed channels as might be present in castellations at the top of a cavity-defining structure.

The channels 36 may present cross-sections of any one or more of a variety of shapes, including but not limited to square, circular, oval, or rectangular cross-sections. The channels may also be oriented regularly (e.g., all orthogonal relative to the surface 16 or the subsurface 18) or irregularly (e.g., skewed or in mixed orientations). However, it is preferred that the interconnecting channels 36 be uniform, regardless of which shape is chosen.

The nominal heights $h_{CHAN}$ of the channels 36 may vary widely in accordance with the particular application. Variations in the channel heights within each cavity-defining structure or set of cavity-defining structures are also permissible, although constant heights $h_{CHAN}$ are preferred.

The nominal transverse dimensions or widths $w_{CHAN}$ of the channels 36 may also vary widely in accordance with the particular application. Variations in the channel widths within each cavity-defining structure or set of cavity-defining structures are also permissible, although constant widths $w_{CHAN}$ are preferred.

The ratio of the total channel height $h_{CHAN}$ to the total cavity-defining structure height $h_{CDS}$ is preferably from approximately two hundredths (0.02) to eight tenths (0.8). Alternatively phrased, the ratio of the height $h_{CDS\_SOL}$ of the solid portion of each cavity-defining structure to its total height $h_{CDS}$ is preferably from approximately two tenths (0.2) to ninety-eight hundredths (0.98). More preferably, the ratio of the channel height $h_{CHAN}$ to the total cavity-defining structure height $h_{CDS}$ is preferably from approximately twenty-five hundredths (0.25) to five tenths (0.5). Alternatively phrased, the ratio of the height $h_{CDS\_SOL}$ of the solid portion of each cavity-defining structure 24 to its total height $h_{CDS}$ is more preferably from approximately five tenths (0.5) to seventy-five hundredths (0.75). A sum of channel heights is preferably used in the above ratios for embodiments in which stacked channels or multiple rows of channels exist in a given cavity-defining structure.

Preferably, the cavity-defining structures 24 are at least substantially non-porous except at the interconnecting channels 36. However, it is permissible according to some aspects of the present invention for the cavity-defining structures to be formed of a generally porous material. In such a case, pore heights should be accounted for in calculating the total channel height $h_{CHAN}$ discussed above.

Preliminary tests of the above-described concept utilizing computational fluid dynamics (CFD) models and simplified as necessary due to computational constraints have indicated that significant reductions in skin friction drag and perhaps even net contributions to thrust may be realized.

A second preferred embodiment of the present invention is illustrated in FIG. 6. It is initially noted that, with certain exceptions to be discussed in detail below, many of the elements of the vehicle or device 110 of the second embodiment are the same as or very similar to those described in detail above in relation to the vehicle or device 10 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the vehicle or device 10, the vehicle or device 110 of the second preferred embodiment preferably includes a solid body 112 defining a surface 114, a subsurface 116, a pair of end walls 118a, and a pair of side walls 118b. The surface 114 is configured to move through a fluid 120 such that the fluid 120 flows across the surface 114 in a primary flow direction $D_{PRIME}$ (preferably, a generally downstream direction).

The solid body 112 also preferably defines a chamber 122 that is recessed relative to the surface 114 and that is at least in part defined by the subsurface 116, the end walls 118a, and the side walls 118b.

A plurality of cavity-defining structures 124 preferably project generally in an outward direction $D_{OUT}$ relative to the subsurface 116. The cavity-defining structures 124 are preferably spaced apart in the primary flow direction $D_{PRIME}$ such that each adjacent pair of cavity-defining structures 124 and the subsurface 116 at least in part cooperatively define a cavity 126 therebetween.

Each cavity 126 preferably has a cavity depth $d_{CAV}$ defined as the distance in an inward direction $D_{IN}$ between the surface 114 and the portion of the subsurface 116 that in part defines the cavity 126.

Each cavity-defining structure 124 preferably presents an outermost face 124a that is recessed relative to the surface 114. That is, the cavity-defining structure heights $h_{CDS}$ are less than the adjacent cavity depths $d_{CAV}$. Although various degrees of recession are permissible without departing from the scope of the present invention, the cavity-defining structure heights $h_{CDS}$ are preferably at least 80% of the adjacent cavity depths $d_{CAV}$.

Preliminary tests of the above-described concept utilizing computational fluid dynamics (CFD) models and simplified as necessary due to computational constraints have indicated that such recession of the outermost faces of the cavity-defining structures can allow a very long and coherent multi-cavity vortex to be established under the main boundary layer flow in relation to that achieved without recession of the outermost faces of the cavity-defining structures.

Each cavity-defining structure 124 preferably spans the entirety of the transverse width of the subsurface 116 without the provision of support structures projecting from the subsurface 116. That is, each cavity-defining structure 124 is preferably a bridge-like structure supported by the side walls 118b. Each cavity-defining structure 124 therefore in part defines only a single interconnecting channel 128 extending between and fluidly interconnecting adjacent ones of the cavities 126, wherein the interconnecting channels 128 are the spaces directly below the cavity-defining structures 124.

Such a single-channel configuration is advantageous in that, among other things, the maximization of the channel 128 width results in a flow pattern having fewer three-dimensional (3D) components than would be found for an analogous multi-channel embodiment like that shown in FIGS. 1-5a. That is, a more two-dimensional (2D) flow pattern is achieved, leading to improved performance.

Each cavity-defining structure 124 is preferably integral with the side walls 118b. However, non-integral support is permissible according to some aspects of the present invention. For instance, the cavity-defining structures might be adhered to the side walls; or fasteners such as tabs, bolts, pegs, or screws might be used.

In summary, the above-described concepts in principle result in much more effective drag reductions, coherent control of vortices, and larger impact on separation control. It is particularly noted that (1) cavities with one or more interconnecting channels therebetween are more effective than cavities without one or more interconnecting channels, (2) channels having greater transverse dimensions are more effective than channels having lower transverse dimensions, and (3) recessed cavity-defining structures are more effective than non-recessed cavity-defining structures.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention set forth in the following claims.

What is claimed is:

1. A high-speed vehicle or device comprising:
   a surface configured to move through a fluid such that the fluid flows across the surface in a primary flow direction, the fluid flow across the surface defining a velocity gradient ranging from a first velocity adjacent the surface to a free stream velocity at a position spaced a first distance from the surface in an outward direction that is at least substantially perpendicular to the primary flow direction, with the fluid flow thereby defining a boundary layer having a boundary layer thickness at least substantially equal to the first distance;
   a subsurface spaced from the surface in an inward direction, the inward direction being at least substantially opposite the outward direction; and
   a plurality of cavity-defining structures projecting generally in the outward direction relative to the subsurface and extending generally transverse to the primary flow direction,
   said cavity-defining structures being spaced apart in the primary flow direction,
   each of said cavity-defining structures presenting a generally upstream face, a generally downstream face, and a midpoint spaced between the upstream face and the downstream face,
   each adjacent pair of said cavity-defining structures and said subsurface at least in part cooperatively defining a cavity therebetween,
   each of said cavities presenting a cavity depth defined as a distance in the inward direction between the surface and the subsurface,
   each of said cavities presenting a cavity length defined as a distance between the midpoints of a corresponding pair of the cavity-defining structures,
   each of said cavity-defining structures at least in part defining at least one interconnecting channel extending between adjacent ones of the cavities to fluidly interconnect said cavities.

2. The vehicle or device of claim 1,
   said at least one interconnecting channel being entirely enclosed, at least in part by a corresponding one of the cavity-defining structures.

3. The vehicle or device of claim 2,
   said interconnecting channel being in part enclosed by the subsurface.

4. The vehicle or device of claim 2,
   each of said cavity-defining structures at least in part defining a plurality of said interconnecting channels.

5. The vehicle or device of claim 4,
   said interconnecting channels being uniform.

6. The vehicle or device of claim 4,
   said interconnecting channels of each cavity-defining structure being at least substantially horizontally aligned.

7. The vehicle or device of claim 4,
   said interconnecting channels of each cavity-defining structure being at least substantially evenly spaced apart in the generally transverse direction.

8. The vehicle or device of claim 4,
   said interconnecting channels of each cavity-defining structure being at least substantially aligned in the primary flow direction with the interconnecting channels of an adjacent cavity-defining structure.

9. The vehicle or device of claim 2,
   said vehicle or device including a solid structure presenting the surface and the subsurface,
   said cavity-defining structures being integral with the solid structure.

10. The vehicle or device of claim 2,
    said cavity-defining structures being at least substantially evenly spaced apart in the primary flow direction.

11. The vehicle or device of claim 2,
    each of said cavity-defining structures presenting an outermost face,
    each of said cavity-defining structures presenting a cavity-defining structure height defined as a distance in the inward direction between the outermost face and the subsurface, each of said cavity-defining structure heights being less than adjacent ones of the cavity depths, such that the outermost face is recessed relative to the surface.

12. The vehicle or device of claim 11,
each of said cavity-defining structure heights being at least 80% of adjacent ones of the cavity depths.

13. The vehicle or device of claim 2,
each of said cavity-defining structures comprising a wall.

14. The vehicle or device of claim 13,
said wall extending at least substantially straight along the generally transverse direction.

15. The vehicle or device of claim 13,
said wall having an at least substantially constant width in the primary flow direction.

16. The vehicle or device of claim 13,
said wall projecting from the subsurface.

17. The vehicle or device of claim 2,
said surface and said subsurface being at least substantially planar.

18. The vehicle or device of claim 17,
said surface and said subsurface being at least substantially parallel.

19. The vehicle or device of claim 2,
said surface presenting a surface contour,
said subsurface presenting a subsurface contour,
said surface contour and said subsurface contour being at least substantially similar.

20. The vehicle or device of claim 2,
said primary flow direction being at least substantially parallel to the surface.

21. The vehicle or device of claim 1,
a ratio of the cavity depth to the cavity length being from approximately 0.5 to 5.

22. The vehicle or device of claim 1,
a ratio of the cavity depth to the boundary layer thickness being from approximately 0 to 0.2.

23. The vehicle or device of claim 1,
each of said cavity-defining structures presenting a cavity-defining structure height defined as a distance in the inward direction between the outermost face and the subsurface
a ratio of the channel height to the cavity-defining structure height being from approximately 0.02 to 0.8.

24. A system for reducing aerodynamic drag and increasing fluid dynamic separation control, said system comprising:
a surface configured to move through a fluid at a high speed such that the fluid flows across the surface in a primary flow direction, the fluid flow across the surface defining a velocity gradient ranging from a first velocity adjacent the surface to a free stream velocity at a position spaced a first distance from the surface in an outward direction that is at least substantially perpendicular to the primary flow direction, with the fluid flow thereby defining a boundary layer having a boundary layer thickness at least substantially equal to the first distance;
a subsurface spaced from the surface in an inward direction, the inward direction being at least substantially opposite the outward direction; and
a plurality of cavity-defining structures projecting generally in the outward direction relative to the subsurface and extending generally transverse to the primary flow direction,
said cavity-defining structures being spaced apart in the primary flow direction,
each of said cavity-defining structures presenting a generally upstream face, a generally downstream face, and a midpoint spaced between the upstream face and the downstream face,
each adjacent pair of said cavity-defining structures and said subsurface at least in part cooperatively defining a cavity therebetween,
each of said cavities presenting a cavity depth defined as a distance in the inward direction between the surface and the subsurface,
each of said cavities presenting a cavity length defined as a distance between the midpoints of a corresponding pair of the cavity-defining structures,
each of said cavity-defining structures at least in part defining at least one interconnecting channel extending between adjacent ones of the cavities to fluidly interconnect said cavities.

* * * * *